United States Patent [19]

Chapman

[11] Patent Number: 4,765,769
[45] Date of Patent: Aug. 23, 1988

[54] LEG KING PIN SYSTEM

[76] Inventor: Leonard T. Chapman, 13760 Chandler Blvd., Van Nuys, Calif. 91401

[21] Appl. No.: 943,629

[22] Filed: Dec. 17, 1986

[51] Int. Cl.[4] ............................................. F16B 7/00
[52] U.S. Cl. ....................................... 403/24; 403/26; 403/162; 384/489
[58] Field of Search ................. 384/489, 607; 403/26, 403/162, 24

[56] References Cited

U.S. PATENT DOCUMENTS

| | | |
|---|---|---|
| 2,522,032 | 9/1950 | Gerry . |
| 2,612,391 | 9/1952 | Boutros ............................... 384/489 |
| 2,842,376 | 7/1958 | Krilanovich . |
| 3,018,116 | 1/1962 | Summers et al. . |
| 3,073,657 | 1/1963 | Oxford ............................ 384/489 X |
| 3,134,455 | 5/1964 | Fiorentini . |
| 4,003,584 | 1/1977 | Zelli . |
| 4,248,444 | 2/1981 | Johnson . |
| 4,335,626 | 6/1982 | Fisher . |

FOREIGN PATENT DOCUMENTS

| | | | |
|---|---|---|---|
| 840166 | 7/1960 | United Kingdom ................ 384/489 |
| 1015369 | 12/1965 | United Kingdom ................ 384/489 |

Primary Examiner—Andrew V. Kundrat
Attorney, Agent, or Firm—Lyon & Lyon

[57] ABSTRACT

The present invention relates to an apparatus for mounting auxiliary components such as a seat, a camera platform or the like at or near the bearings which support the dolly or carriage wheels or articulated legs. The present includes at least one cap member and a receiving tube. Each cap member is arranged so as to transfer any force placed on the receiving tube directly onto the vehicle frame rather than the bearings associated with the leg king pin system. The cap members also serve to exclude contaminants from the bearing means of the leg king pin system. Rotation of the leg king pin driveshaft is not impeded by the receiving tube. One embodiment of the present invention also includes a groove in one of the cap members to permit the locking of the leg locking pin in the disengaged position.

9 Claims, 2 Drawing Sheets

LEG KING PIN SYSTEM

BACKGROUND OF THE INVENTION

The present invention relates to carriages and more particularly, to means for mounting an auxiliary unit such as a seat or the like on a carriage.

The prior art includes a number of mobile carriages or dollies and accessories therefore. Many of these dollies or carriages include articulated legs. For example, U.S. Pat. No. 2,842,376 to Krilanovich discloses a wheel steering mechanism for camera dollies and the like. Similarly, U.S. Pat. No. 3,134,455 to Fiorentini discloses a universal truck with steering and driving wheels. Fisher, U.S. patent application No. 4,335,626 describes a variable ratio rotary positioning mechanism and camera dolly steering mechanisms embodying same. U.S. Pat. No. 3,018,116 to Summers, et al. discloses a steering mechanism for a camera dolly. Likewise, U.S. Pat. No. 4,248,444 to Johnson discloses a steering mechanism for a mobile carriage. Lastly, U.S. Pat. No. 4,003,584 to Zelli discloses a dolly with articulated and steerable wheels. None of the devices of the prior art, however, disclose a means for mounting an auxiliary apparatus such as a seat or the like on such mobile dollies or carriages at or near the bearings which support the dolly or carriage wheels or articulated legs. This failing of the prior art increases the difficulty and decreases the comfort to the user of such a carriage or dolly. Similarly, none of the prior art teaches the use of contaminant shields similar to those of the present invention.

For example, the above U.S. patents to Zelli and Johnson disclose mobile carriages with steerable wheels. Neither of those patents, however, suggest or disclose the use of a contaminant shield similar to that of the present invention nor do they suggest or disclose the ability to mount an auxiliary apparatus such as a seat or the like to the frame of such a mobile dolly or carriage through a contaminant shield. Similarly, although the Summers, et al. patent does disclose an upper bearing cover (37), nothing in that patent suggests or discloses a means for mounting an auxiliary apparatus such as a seat or the like on the mobile dolly or carriage in conjunction with a contaminant shield at or near the bearings which support the dolly or carriage wheels or articulated legs similar to the present invention. Lastly, U.S. patent to Gerry, U.S. Pat. No. 2,522,032 also fails to disclose the means for mounting an auxiliary apparatus such a seat or the like on a mobile dolly or carriage in conjunction with a contaminant shield at or near the bearings which support the mobile dolly or carriage wheels or articulated legs.

SUMMARY OF THE INVENTION

The present invention provides a means for mounting an auxiliary device such as a seat or the like to the frame of a mobile dolly or carriage at or near the bearings which support the vehicle wheels or articulated legs. In addition, the present invention also provides a contaminant shield to protect the leg kingpin bearings, steering mechanisms and any adjacent components. Accordingly, the object of the present invention is to provide a means for accommodating an auxiliary apparatus such as a seat or the like on a mobile dolly or carriage.

Further and more detailed objects of the present invention will be apparent to those skilled in the art from the disclosure contained herein.

DESCRIPTION OF THE FIGURES

The present invention will be described more fully in reference to the accompanying drawings, wherein.

DETAILED DESCRIPTION OF THE PREFERRED EMBODIMENTS

Figure 1:
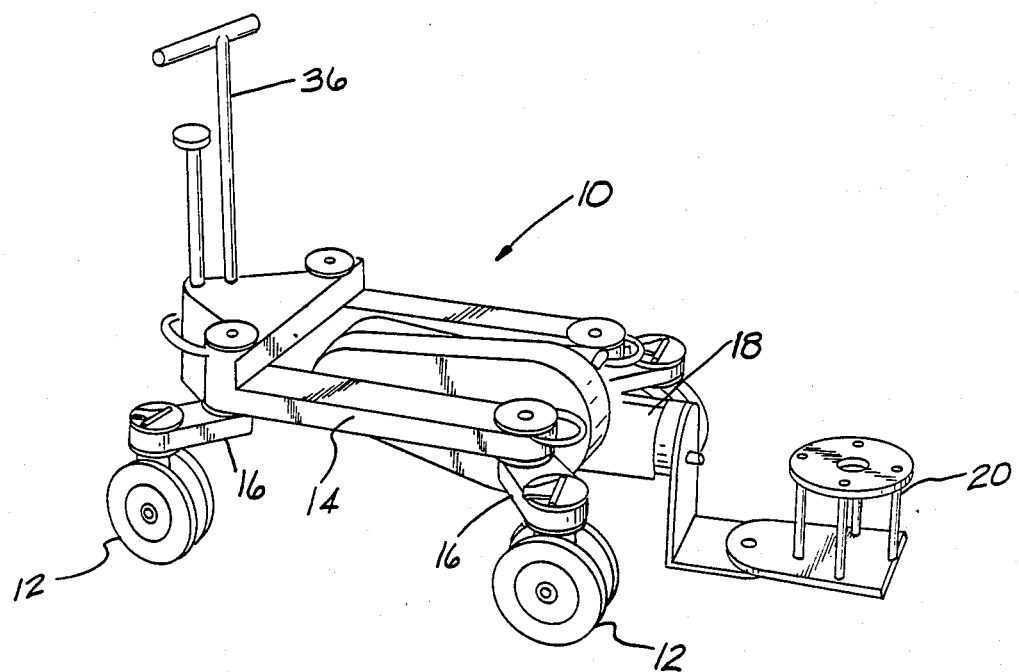
FIG. 1 is a perspective view of a mobile carriage or dolly including the present invention.
Figure 2:
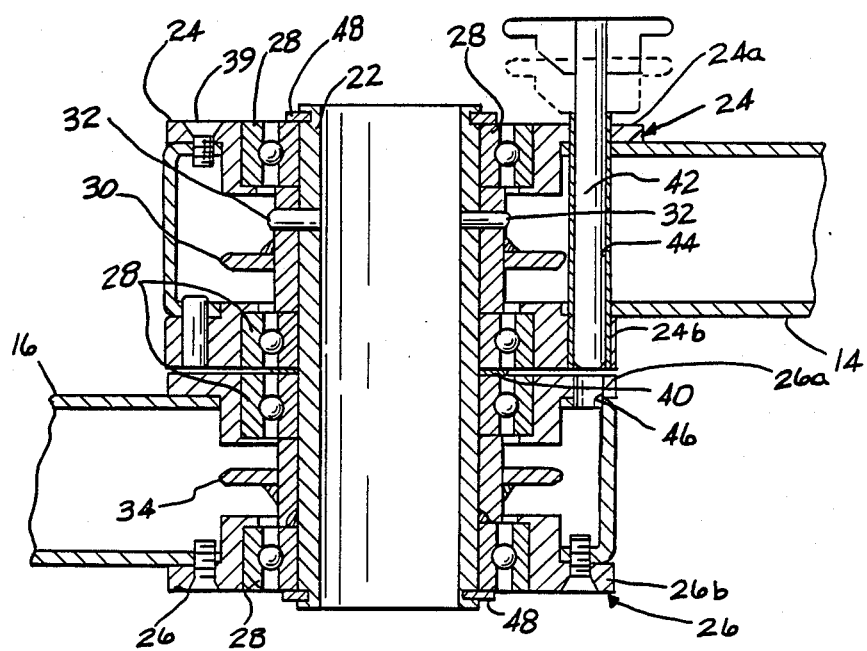
FIG. 2 is a perspective sectional view of a prior art kingpin mounting system for mounting wheels on a mobile dolly or carriage.

As will be understood to those skilled in the art, the present invention may be utilized in any type of mobile dolly or carriage. As is best illustrated in FIG. 1, for purposes of example, the present invention is described in connection with a mobile dolly 10 or carriage having four pairs of tandem steerable wheels 12. Each of the wheels 12 are connected to the dolly frame 14 through lockable pivoting leg member 16 which permits the wheels to turn as well as articulate. The dolly or carriage 10 illustrated in FIG. 1 also includes an extendable boom 18 and a mounting platform 20 on which photographic equipment such as a not shown camera or video camera may be mounted.

Each of the pivoting legs 16 is preferably mounted to the dolly or carriage frame 14 through a series of bearing means and the like as hereinafter described, which permit the wheels 12 of the dolly or carriage 10 to be steerable. A driveshaft 22 extends from the dolly frame 14 through the frame of each of the pivoting legs 16. The driveshaft 22 is surrounded by an upper and a lower bearing support housing, 24 and 26, respectively, which are connected to the dolly frame 14 and the frame of the pivoting leg member 16, respectively. Each of the bearing support housings includes an upper plate 24a and 26a, and a lower plate 24b and 26b, respectively. Bearing means 28 permit rotation of the driveshaft 22 within the upper and lower bearing housings 24 and 26, respectively. A drive sprocket 30 is fixedly secured to the driveshaft 22 through fixed pin means 32 within the upper bearing housing 24.

Similarly, a driven sprocket 34 is affixed to the driveshaft 22 within the lower bearing housing 26. As is known in the prior art, a not-shown continuous chain extends from a drive mechanism 36 near the front of the dolly or carriage to, the drive sprocket 30 which corresponding to each wheel 12. Similarly, a not-shown continuous chain extends from each driven sprocket 34 to a not-shown wheel mounting and drive shaft and sprocket in the opposite end of each pivoting leg member 16. Accordingly, steering of each of the wheels 12 is permitted by rotation of the steering mechanism 36. Articulation of one or more of the legs of the present invention may be accomplished in an analogous known manner.

Servicing of any of the bearings and continuous chains is facilitated by disengaging the continuous chain from the corresponding sprocket, removing the upper retaining ring 48 and then pressing downward on the drive shaft 22. The entire leg assembly is thus removed from the dolly frame 14 in order to facilitate service and maintenance of the dolly steering system.

A spacer ring 40 is positioned between the upper bearing housing 24 and the lower bearing housing 26 in order to permit relative rotation between the pivoting leg frame 16 and the dolly frame 14. Because the bearings 20 are preferably press fit onto the driveshaft 22 the legs pivot about the outer surface of the bearing means. This permits the upper 24 and lower 26 bearing housings to remain stationary at all times. An appropriately-sized spacer ring 40 is preferably inserted between the upper and lower bearings, 24 and 26, respectively. This spacer ring need not be coated with a low-friction material so as to alleviate friction forces upon leg pivoting or articulation between the lower plate 24b of the upper bearing housing 24 and the upper plate 26a of the lower bearing housing 26 since no relative rotational movement occurs therebetween. Snap rings or retaining rings 48 fitted at each end of the driveshaft 22 act to maintain the vertical orientation and position of each of the abovedescribed components.

It is often desirable to lock the pivoting leg 16 into a selected position. In order to accomplish this, a leg locking pin 42 may be slideably inserted in a receiving bushing 44 in the dolly frame 14 and the upper and lower plates 24a and 24b, respectively, of the upper bearing housing 24. Similarly, a plurality of lower receiving shafts 46 are provided in the upper plate 26a of each lower bearing housing 26. When one of the lower receiving bushings 46 is aligned with the upper receiving bushing 44, the leg locking pin 42 may be inserted through the upper and lower receiving bushings 44 and 46, respectively, so as to effectively prevent further articulation of the pivoting leg 16. The receiving bushings can be straight or tapered to receive a corresponding straight or tapered end configuration of shaft 42.

Figure 3:
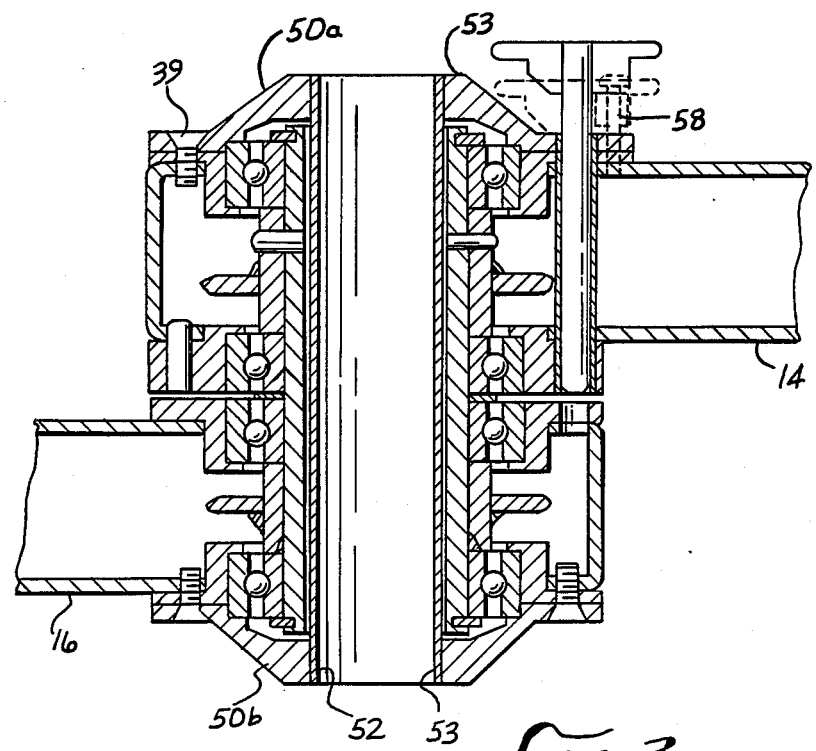
FIG. 3 is a perspective view showing the first embodiment of the present invention on a perspective sectional view of a leg kingpin mounting apparatus.

Turning to FIG. 3, the preferred embodiment of the present invention includes an upper and lower cap member 50 and a receiving tube 52. The receiving tube 52 is preferably press fit into a central opening 53 in the upper cap member 50 while slip fit into a central opening 53 in the lower cap member 50b.

So constructed, the receiving tube 52 is arranged so as to receive and support an auxiliary device such as a seat post or an additional camera platform post. The cap members 50 are arranged such that any load placed upon the receiving tube 52 is transmitted to the dolly frame 14 and possibly the frame of the pivoting leg 16 rather than directly on the bearing means 28 associated with the articulated legs and the rotating driveshaft. In addition, the present invention permits the drive shaft 22 to rotate unimpeded or affected by the cap members 50 and the receiving tube 52. Thus, the present invention makes possible the mounting of a seat or auxiliary device such as an additional camera platform without placing excessive force on the bearings which assist in the articulation of the dolly or carriage pivoting legs 16 and prevents the unintentional and unwanted rotation of the auxiliary device upon articulation of the pivoting leg or the turning of steerable wheels 12. Similarly, the cap members 50 act to prevent contaminants from entering bearing means and the area of the steering sprockets so as to decrease the recurring maintenance associated with such components.

Figure 4:
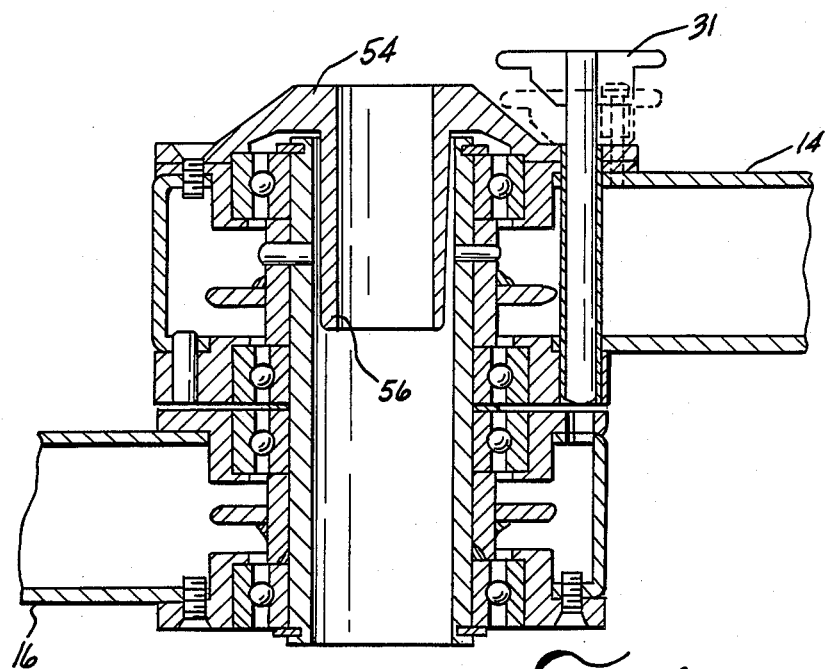
FIG. 4 is a perspective sectional view of second embodiment of the present invention mounted on a leg kingpin mounting apparatus.

The second embodiment of the preferred invention, illustrated in FIG. 4, includes an upper cap member 54 which has a truncated receiving tube 56 integral therewith. The receiving tube preferably fits within the driveshaft 22. Again, the cap member 54 serves as a contaminant shield which also actively supports the receiving tube 56 from the dolly frame 14 rather than the kingpin bearings so as to directly transfer any load placed thereon to the dolly frame 14. As most contaminants enter bearings arranged as these from above, the single contaminant shield is still substantially effective in maintenance and cleaning of the bearings. Similarly, the present arrangement permits the driveshaft 22 to rotate uninhibited by the receiving tube 56. Moreover, in view of the truncated receiving tube 56, the second embodiment of the present invention could also be readily used in conjunction with a dolly having steerable wheels but which does not have articulated legs.

In both embodiments of the present invention, a stay 58, which extends from the upper cap member, acts in conjunction with a not-shown groove in the leg-locking pin actuation member 43 so as to permit the continuous disengagement of the leg-locking pin 42, supported by the bushing 44. The leg locking pin actuation member 43 is lifted and then rotated by a preselected amount to prevent it from falling down and reseating pin 42 into the bushing 46.

The above description is provided for purposes of example only and should not be construed to limit the scope of the invention set forth in the claims appended hereto.

I claim:

1. A leg king pin system for mounting an auxiliary unit to an articulated joint on a mobile dolly having a frame, comprising, at least one cap member and a receiving tube, said cap members being arranged so as to support said receiving tube on the frame of the mobile dolly.

2. The leg king pin system as set forth in claim 1 wherein an upper cap member and lower cap member are provided, said receiving tube extending between a central opening in each said cap member.

3. A leg king pin system as set forth in claim 2 wherein said receiving tube is press fit into said central opening in said upper cap member and said receiving tube is slip fit into said central opening in said lower cap member.

4. A leg king pin system as set forth in claim 1 wherein said leg king pin system includes a truncated receiving tube which is integrally conformed with said cap member.

5. A leg king pin system as set forth in claim 3 wherein each said end cap member is further arranged so as to act as a cover to exclude contaminants from the bearings of the leg king pin system.

6. A leg king pin system as set forth in claim 5 wherein said leg king pin system further includes a selectively engageable locking pin and said cap includes a stay which is arranged so as to selectively support said leg locking pin in its disengaged condition upon rotation thereof.

7. A leg king pin system for mounting an auxiliary unit to an articulated joint of a mobile dolly, the articulated joint having a hollow drive shaft disposed within a bearing supported in a bearing housing on a frame of the mobile dolly comprising:

a cap member including an integral receiving tube and a cap flange, said receiving tube at least partially disposed within and spaced apart from the drive shaft, and said cap flange positioned at least partially over one of the bearing housing and the mobile dolly frame.

8. The leg king pin system of claim 7 wherein said cap flange has a trapezoidal cross section.

9. The leg king pin system of claim 7 wherein said cap flange covers the bearing and thereby prevents contaminants from entering the bearing.

* * * * *